(12) United States Patent
Madden et al.

(10) Patent No.: US 11,073,946 B2
(45) Date of Patent: Jul. 27, 2021

(54) DYNAMIC EXCLUSION ZONE FOR TOUCHSCREEN PHYSICAL CONTROLS

(71) Applicant: FORD GLOBAL TECHNOLOGIES, LLC, Dearborn, MI (US)

(72) Inventors: Thomas Madden, Plymouth, MI (US); Sarthak Manna, Dearborn, MI (US); Jeffery Dippel, New Hamburg (CA); Mohammad Kalash, Dearborn, MI (US); Rachad El-Kaafarani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/684,726

(22) Filed: Nov. 15, 2019

(65) Prior Publication Data

US 2021/0149541 A1    May 20, 2021

(51) Int. Cl.
*G06F 3/0362* (2013.01)
*G06F 3/041* (2006.01)
*G06F 3/044* (2006.01)

(52) U.S. Cl.
CPC ........ *G06F 3/04186* (2019.05); *G06F 3/0362* (2013.01); *G06F 3/044* (2013.01)

(58) Field of Classification Search
CPC .................................................. G06F 3/0362
USPC ........................................................ 345/174
See application file for complete search history.

(56) References Cited

U.S. PATENT DOCUMENTS

| | | | |
|---|---|---|---|
| 9,158,422 B2 | 10/2015 | Craig et al. | |
| 9,513,707 B2 | 12/2016 | Lisseman et al. | |
| 10,318,078 B2 | 6/2019 | Okuzumi et al. | |
| 2011/0069021 A1 | 3/2011 | Hill | |
| 2014/0225857 A1* | 8/2014 | Ma ...................... | G06F 3/04847 345/174 |
| 2016/0283026 A1 | 9/2016 | Koike et al. | |
| 2019/0129558 A1* | 5/2019 | Yildiz ................... | G06F 3/0412 |

* cited by examiner

*Primary Examiner* — Long D Pham
(74) *Attorney, Agent, or Firm* — Michael J. Spenner; Brooks Kushman P.C.

(57) ABSTRACT

Touch input from a user may be selectively ignored. Responsive to receipt of touch input to a physical control, the physical control at least partially overlapping a touchscreen configured to display onscreen controls, a size of an exclusion zone surrounding the physical control may be increased from a default size to an enlarged size greater than the default size, the exclusion zone representing an area of the touchscreen within which touch input to the touchscreen is not passed to an application executed by the processor. Responsive to a lack of receipt of the touch input to the physical control, the size of the exclusion zone may be decreased from the enlarged size to the default size, allowing touch input to onscreen controls outside the default size of the exclusion zone to be passed to the application.

19 Claims, 5 Drawing Sheets

DYNAMIC EXCLUSION ZONE FOR TOUCHSCREEN PHYSICAL CONTROLS

TECHNICAL FIELD

Aspects of the present disclosure generally relate to a dynamic exclusion zone surrounding physical controls in proximity to a touch screen, where touch input within the exclusion zone may be selectively ignored.

BACKGROUND

A touchscreen is a combination input and output device. A touch screen may include a display layer, such as a light-emitting diode (LED) screen or organic LED (OLED) screen, and a touch-sensitive layer, such as a capacitive touch or resistive touch layer. A resistive touchscreen may include multiple electrically resistive layers, such that pressure to the screen causes the layers to move together, thereby reducing the resistance between the layers at the touch point. A capacitive touchscreen panel, in contrast, includes an insulator later, such as glass, coated with a transparent conductor. As the human body is also an electrical conductor, touching the surface of the screen results in a distortion of the electrostatic field of the touchscreen, which can be measured as a change in capacitance at the location of the touch. As compared to resistive touchscreens, capacitive touchscreens typically cannot be used to detect a finger through electrically insulating material, such as through gloves.

SUMMARY

In one or more illustrative examples, a system for selectively ignoring touch input from a user includes a touchscreen, configured to display onscreen controls and to receive touch input, a physical control, at least partially overlapping the touchscreen, additionally configured to receive touch input; and a processor, programmed to, responsive to receipt of touch input to the physical control, increase a size of an exclusion zone surrounding the physical control from a default size to an enlarged size greater than the default size, the exclusion zone representing an area of the touchscreen within which touch input to the touchscreen is not passed to an application executed by the processor, and responsive to a lack of receipt of the touch input to the physical control, decrease the size of the exclusion zone from the enlarged size to the default size, to allow touch input to onscreen controls outside the default size of the exclusion zone to be passed to the application.

In one or more illustrative examples, a method for selectively ignoring touch input from a user includes, responsive to receipt of touch input to a physical control, the physical control at least partially overlapping a touchscreen configured to display onscreen controls, increasing a size of an exclusion zone surrounding the physical control from a default size to an enlarged size greater than the default size, the exclusion zone representing an area of the touchscreen within which touch input to the touchscreen is not passed to an application executed by the processor; and responsive to a lack of receipt of the touch input to the physical control, decreasing the size of the exclusion zone from the enlarged size to the default size, allowing touch input to onscreen controls outside the default size of the exclusion zone to be passed to the application.

In one or more illustrative examples, a non-transitory computer-readable medium includes instructions selectively ignoring touch input from a user that, when executed by a processor of a computing device, cause the computing device to, responsive to receipt of touch input to a physical control, the physical control at least partially overlapping a touchscreen configured to display onscreen controls, increase a size of an exclusion zone surrounding the physical control from a default size to an enlarged size greater than the default size, the exclusion zone representing an area of the touchscreen within which touch input to the touchscreen is not passed to an application executed by the processor; and responsive to a lack of receipt of the touch input to the physical control, decrease the size of the exclusion zone from the enlarged size to the default size, allowing touch input to onscreen controls outside the default size of the exclusion zone to be passed to the application.

DETAILED DESCRIPTION

Figure 1:
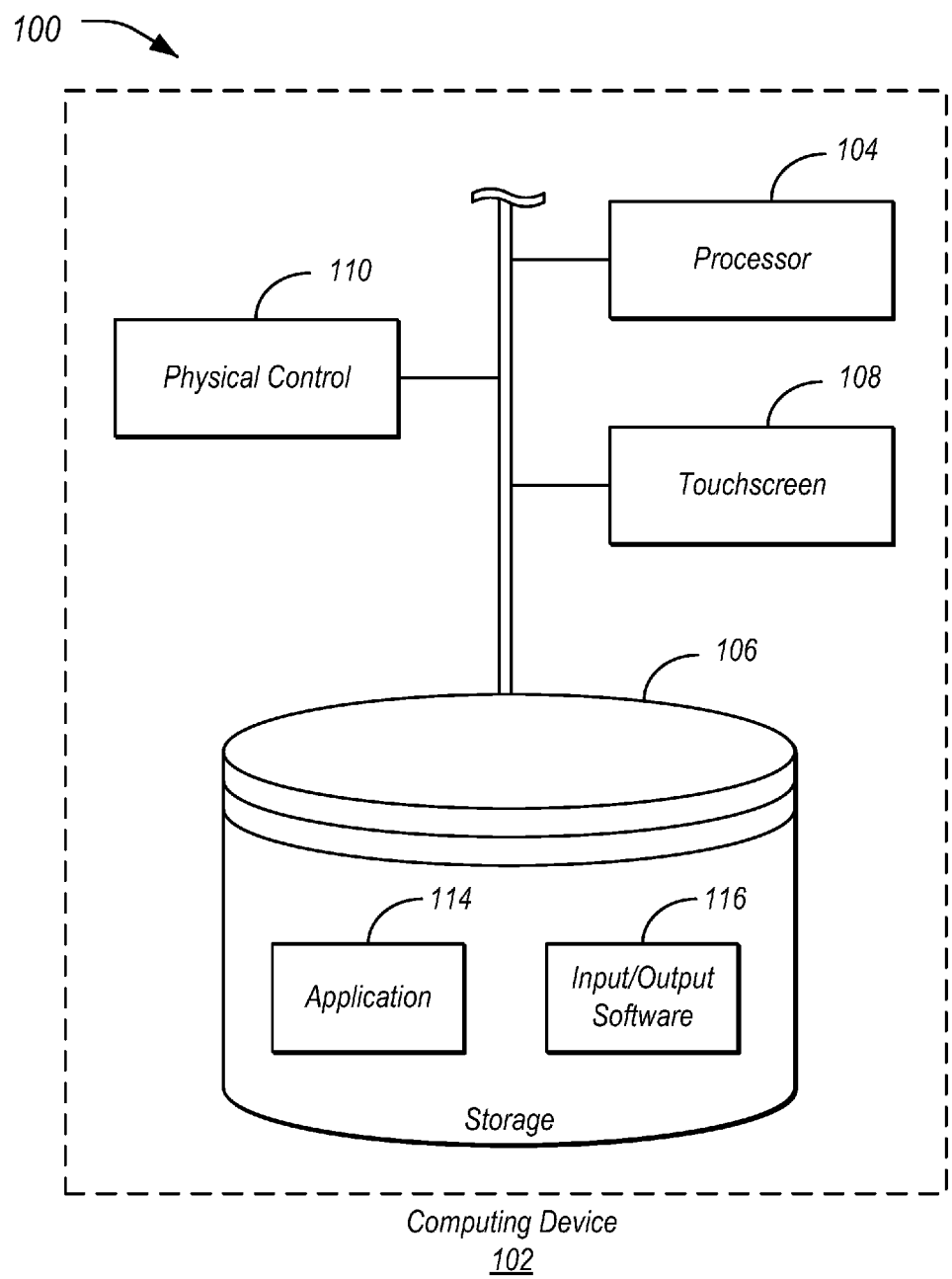
FIG. 1 illustrates an example system including a computing device for implementing a dynamic exclusion zone surrounding one or more physical controls in proximity to a touchscreen.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

A touch display may include one or more physical controls that are physically inset into the touch display. These physical controls may include, as an example, a physical knob. Onscreen controls placed within a distance to the physical control may be accidentally triggered when a user attempts to use the physical control knob. This distance may be, for example, 25 millimeters (mm), or an average finger width. However, it may be visually undesirable and space inefficient to avoid placing controls within that area.

The physical controls may additionally have the ability to detect when the physical control is being touched by a hand or finger. A touch screen exclusion zone may be established around the physical control. The exclusion zone may be a minimum distance from the physical control. Touch input to the display screen that is within the exclusion zone may be ignored. Responsive to detection of physical contact if the user with the physical control, the touch exclusion zone may grow from an initial default distance around the physical control (e.g., 6 mm) to an expanded distance around the physical control (e.g., 25 mm). Responsive to the user no longer having physical contact with the physical control, the touch exclusion zone may be reduced back to the default distance around the physical control.

This dynamic exclusion zone may, in an example, be enforced in software by the human-machine interface (HMI) layer of the system, to allow for selective ignoring of touch input without requiring changes to the display hardware or firmware. Moreover, this solution may also allow for onscreen controls to be placed closer to the physical control than a finger width, with minimal possibility of the onscreen controls being accidentally actuated while the user is interacting with the physical control.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

FIG. 1 illustrates an example system 100 including a computing device 102 for implementing a dynamic exclusion zone surrounding one or more physical controls 110 in proximity to a touchscreen 108. As shown, the computing device 102 includes a processor 104 that is operatively connected to a storage 106, to the touchscreen 108, and to the physical controls 110. The storage 106 of the computing device 102 stores applications 114 which may provide user interfaces to the touchscreen 108 and receive input from the touchscreen 108. The storage 106 may further include input/output software 116 to allow the applications 114 to interact with the functionality of the touchscreen 108 and the physical controls 110. It should be noted that this is merely an example, and computing devices 102 with more, fewer, or different components may be used.

The computing device 102 may include an in-vehicle infotainment system, such as a center stack or a rear-seat infotainment system. As some other examples, the computing devices 102 may be any of various types of portable computing device, such as cellular phones, tablet computers, smart watches, laptop computers, portable music players, or other devices having processing and communications capabilities.

The processor 104 may include one or more integrated circuits that implement the functionality of a central processing unit (CPU) and/or graphics processing unit (GPU). In some examples, the processor 104 is a system on a chip (SoC) that integrates the functionality of the CPU and GPU. The SoC may optionally include other components such as, for example, the storage 106 and a network device into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families. Additionally, alternative embodiments of the processor 104 can include microcontrollers, application specific integrated circuits (ASICs), field programmable gate arrays (FPGAs), digital signal processors (DSPs), or any other suitable digital logic devices.

During operation, the processor 104 executes stored program instructions that are retrieved from the storage 106. The stored program instructions include software that controls the operation of the processor 104 to perform the operations described herein. The storage 106 may include both non-volatile memory and volatile memory devices. The non-volatile memory includes solid-state memories, such as NAND flash memory, magnetic and optical storage media, or any other suitable data storage device that retains data when the computing device 102 is deactivated or loses electrical power. The volatile memory includes static and dynamic random-access memory (RAM) that stores program instructions and data during operation of the computing device 102.

The GPU may include hardware and software for display of at least two-dimensional (2D) and optionally three-dimensional (3D) graphics to the touchscreen 108. The touchscreen 108 may include various devices configured to display content as well as to receive touch input. In many examples, the touchscreen 108 may be a capacitive touch screen, but other possibilities are contemplated. In some examples, the processor 104 executes software programs using the hardware functionality in the GPU to accelerate the performance of machine learning or other computing operations described herein.

The physical controls 110 may include any of various physical devices that enable the computing device 102 to receive control input from users. Examples of suitable input devices that receive human interface inputs may include physical knobs, buttons, trackballs, and switches. In addition, the physical controls 110 may further include touch-sensitive functionality, such that the physical controls 110 are able to sense that they are being touched, even if no input is presently being input to the physical controls 110.

In one example, the physical controls 110 may include capacitive touch functionality to allow the physical controls 110 to be able to identify whether the physical control 110 is being touched by a user. In another example, the physical controls 110 may lack capacitive touch functionality, but may be conductively coupled to the surface of the touchscreen (e.g., via an electrically-conductive finger on the physical control in contact with the touchscreen 108), such that presence of the user's hand or fingers on the physical controls 110 is detected by the touchscreen 108 apart from touch input to the touchscreen 108 itself.

The applications 114 are examples of stored program instructions that are retrieved from the storage 106 and executed by the processor 104 to provide information to the touchscreen 108. The applications 114 also receive input from the users, including touch input received by the touchscreen 108 as well as touch or other input received to the physical controls 110.

The input/output software 116 may also be an example of program instructions that are retrieved from the storage 106 and executed by the processor 104. The input/output software 116 may be programmed to communicate with the touchscreen 108 and physical controls 110 (e.g., at an operating system level or at a driver level), and may also be programmed to raise events or provide other communications between the applications 114 and the hardware of the computing device 102. In an example, the input/output software 116 may pass input received to the touchscreen 108 and to the physical controls 110 to the applications 114. In another example, the input/output software 116 may pass output provided by the applications 114 to the touchscreen 108 for display.

Figure 2:
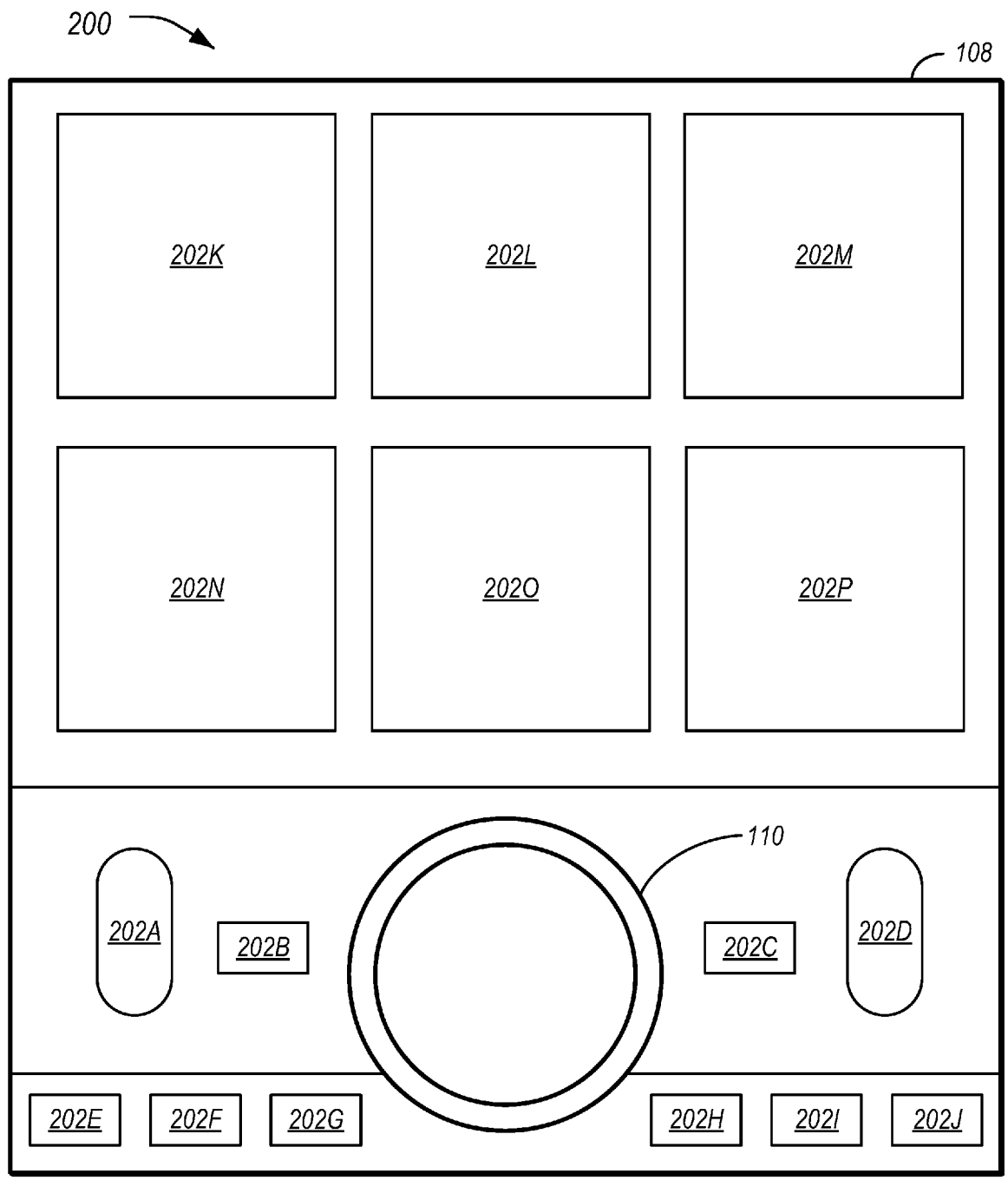
FIG. 2 illustrates an example user interface provided by an application to the touchscreen of the computing device.

FIG. 2 illustrates an example user interface 200 provided by an application 114 to the touchscreen 108 of the computing device 102. As shown, the user interface 200 includes a plurality of onscreen controls 202A-202P (collectively 202) that are drawn to the touchscreen 108 by the application 114. The user interface 200 further includes a physical control 110, in this example a physical knob, where the physical control 110 is physically inset into the touchscreen 108. Using the user interface 200, a user may interact with the onscreen controls 202 by providing touch input via his or her fingers. Additionally, or alternatively, the user may interact with the physical control 110, for example, by providing rotational movement to the knob.

Figure 3A:
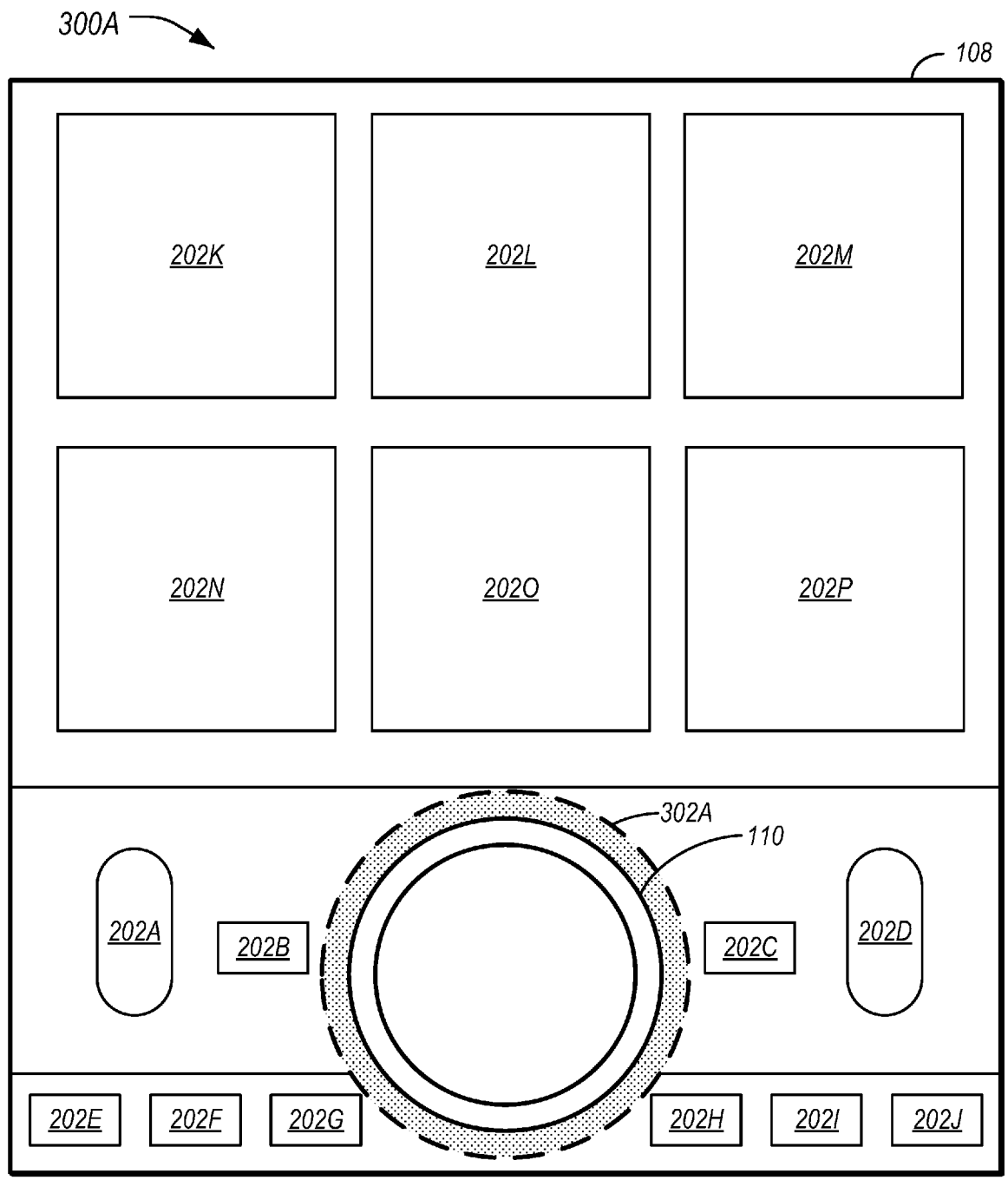
FIG. 3A illustrates an example user interface provided by the application, illustrating a representation of a default exclusion zone of a default distance around the physical control.

FIG. 3A illustrates an example user interface 300A provided by the application 114, illustrating a representation of a default exclusion zone 302A of a default distance around the physical control 110. As shown, the exclusion zone 302A represents an area of the touchscreen 108 where touch input to the touchscreen 108 is not passed from the input/output software 116 to the application 114. This exclusion zone 302A may be set to the initial default distance around the physical control 110 (e.g., 6 mm), to allow the user to be able to manipulate onscreen controls 202 within close proximity to the physical control 110.

However, some of the onscreen controls 202 placed close to the physical control 110 may be accidentally triggered when a user attempts to use physical control 110. For instance, as illustrated, the onscreen controls 202B, 202C, 202G, and 202H are close to the physical control 110, and may be unintentionally touched by a user providing input via the physical control 110. One solution to avoiding such unintentional input to the onscreen controls 202 is to avoid placing onscreen controls 202 near the physical control 110. However, it may be visually undesirable and space inefficient to put this limitation on the design of the user interface 300A provided by the application 114.

Figure 3B:
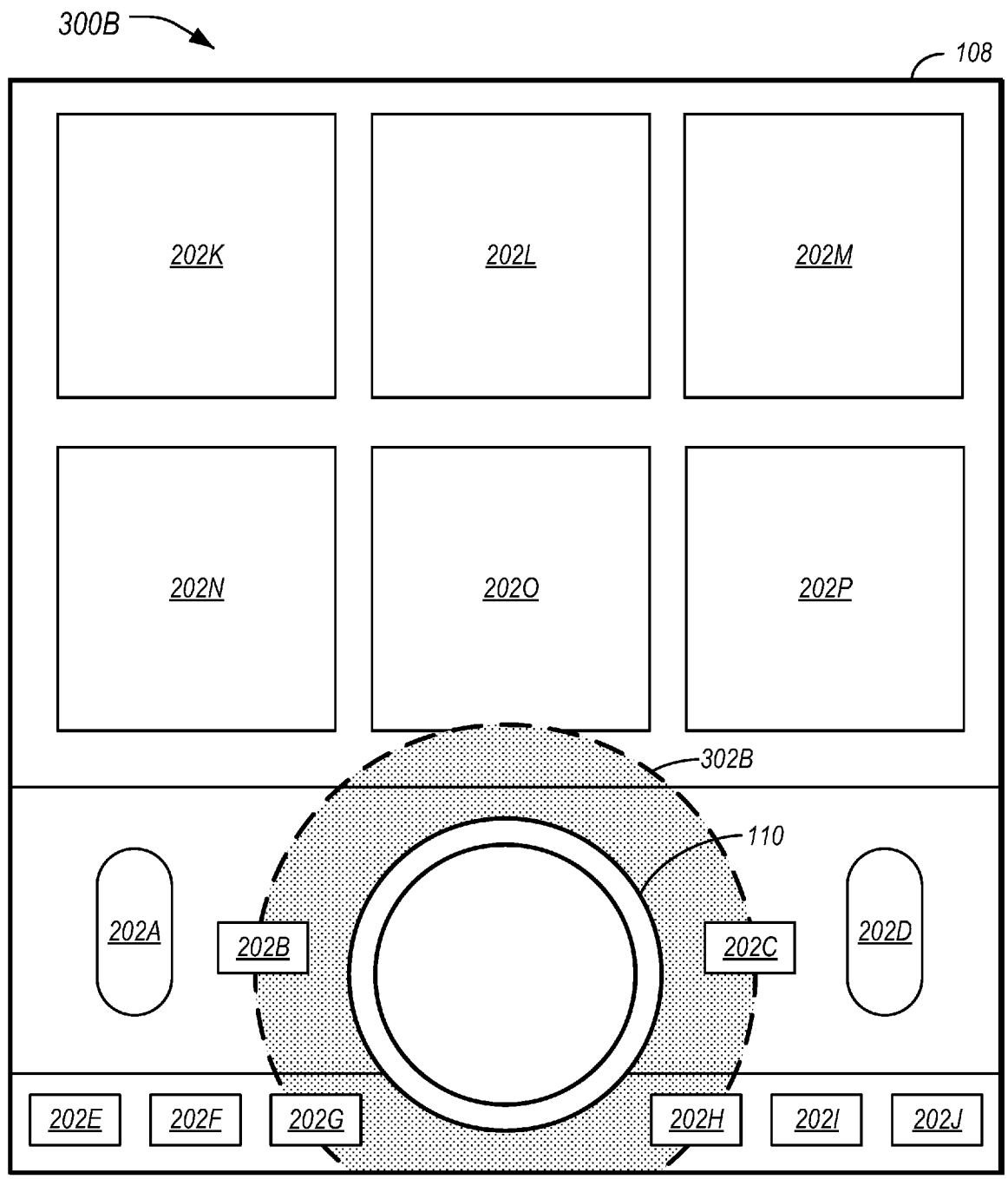
FIG. 3B illustrates an example user interface provided by the application, illustrating a representation of an expanded exclusion zone of a further distance around the physical control.

FIG. 3B illustrates an example user interface 300B provided by the application 114, illustrating a representation of an expanded exclusion zone 302B of a further distance around the physical control 110. As with the exclusion zone 302A, the exclusion zone 302B represents an area of the touchscreen 108 where touch input to the touchscreen 108 is not passed from the input/output software 116 to the application 114. However, as compared to the exclusion zone 302A, the exclusion zone 302B is enlarged to a further default distance around the physical control 110 (e.g., 25 mm), to suppress input to the touchscreen 108 when the user is manipulating the physical control 110, to avoid generating extraneous press input to the touchscreen 108 as well.

The physical control 110 may be configured to detect when the physical control 110 is being touched by a hand or finger. Responsive to detection of such physical proximity or contact to the physical control 110, the input/output software 116 may expand the distance around the physical control in which touch input to the touchscreen 108 is ignored. In an example, the input/output software 116 may expand the default exclusion zone 302A as shown in FIG. 3A to the expanded exclusion zone 302B as shown in FIG. 3B. Moreover, responsive to the user no longer having physical contact with the physical control 110, the input/output software 116 may shrink the exclusion zone 302B back to the default exclusion zone 302A around the physical control 110.

Figure 4:
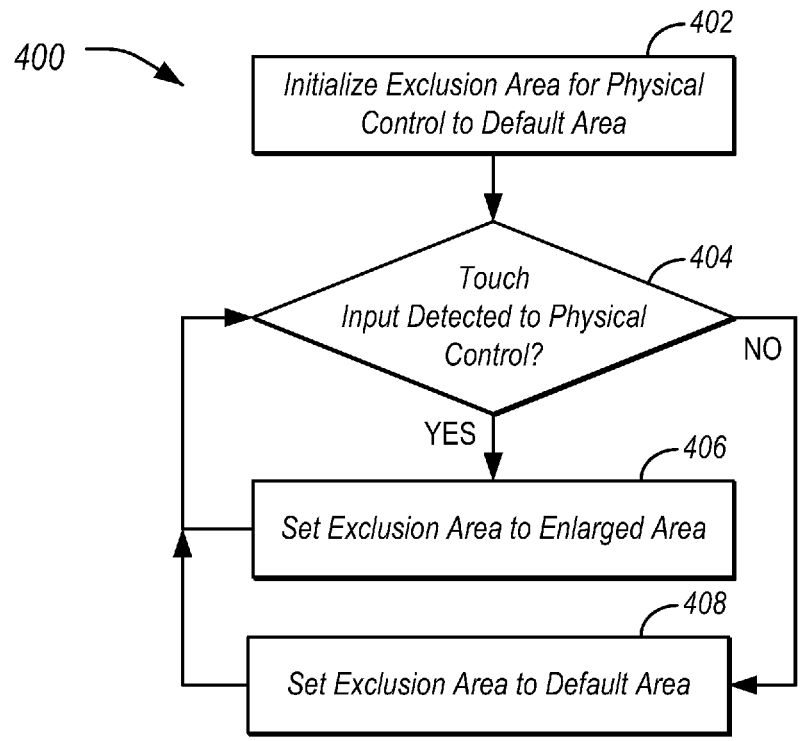
FIG. 4 illustrates an example process for adjusting the size of the exclusion zone based on the detection of touch input to the physical control.

FIG. 4 illustrates an example process 400 for adjusting the size of the exclusion zone 302 based on the detection of touch input to the physical control 110. In an example, the process 400 may be performed by the computing device 102 discussed in detail above.

At operation 402, the computing device 102 initializes the exclusion zone 302 to the default exclusion zone 302A size. In an example, the input/output software 116 may set the size of the exclusion zone 302 to the default size. The default size may, in many examples, allow for onscreen controls 202 to be placed in close proximity to the physical control 110.

At operation 404, the computing device 102 determines whether touch input is detected to the physical control 110. In one example, the physical control 110 may include capacitive touch functionality that allows the physical control 110 to be able to identify whether the physical control 110 is being touched by a user. In another example, the physical control 110 may lack capacitive touch functionality, but may be conductively coupled to the surface of the touchscreen (e.g., via an electrically-conductive finger on the physical control in contact with the touchscreen 108), such that presence of the user's hand or fingers on the physical control 110 is detected by the touchscreen 108 in a location specific to the physical control 110. Regardless of approach, the input/output software 116 may receive the touch input indicative of close presence or touch of the user to the physical control 110. If such input is received, control passes to operation 406. Otherwise, if no such input is received, control passes to operation 408.

At operation 406, the computing device 102 sets the exclusion zone 302 to the enlarged exclusion zone 302B size. An example enlarged exclusion zone 302B is illustrated in the example 300B. By enlarging the exclusion zone 302, the input/output software 116 may suppress input to the touchscreen 108 when the user is manipulating the physical control 110, to avoid generating extraneous press input to the touchscreen 108 as well. After operation 406, control returns to operation 404.

At operation 408, the computing device 102 sets the exclusion zone 302 to the default exclusion zone 302A size. An example default exclusion zone 302A is illustrated in the example 300A. By returning the exclusion zone 302 to the default size, the input/output software 116 may again allow input to onscreen controls 202 that are in close proximity to the physical control 110. After operation 408, control returns to operation 404.

Figure 5:
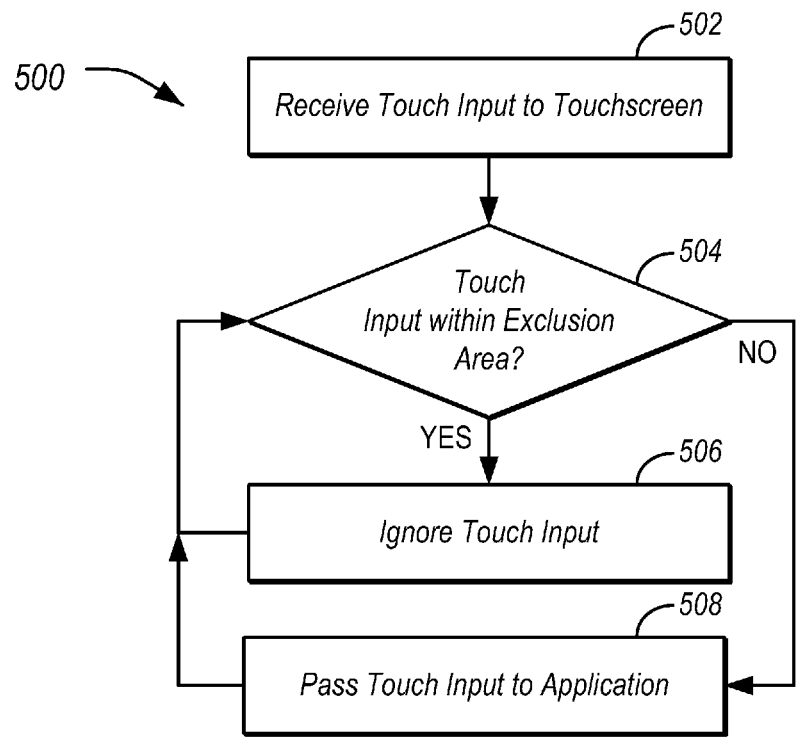
FIG. 5 illustrates an example process for utilizing the exclusion zone to selectively provide touchscreen input to the application.

FIG. 5 illustrates an example process 500 for utilizing the exclusion zone 302 to selectively provide touchscreen 108 input to the application 114. As with the process 400, in an example the process 500 may be performed by the computing device 102 discussed in detail above.

The process 500 may be initiated, as shown in operation 502, responsive to the receipt of touch input to the touchscreen 108. In an example, the user of the computing device 102 may attempt to press one of the onscreen controls 202 displayed by the application 114 to the touchscreen 108. In another example, the user of the computing device 102 may attempt to provide input to the physical control 110 but may inadvertently provide input to the touchscreen 108.

At operation 504, the computing device 102 determines whether the touch input is within the exclusion zone 302. In an example, the input/output software 116 may receive the indication of touch input from the touchscreen 108 and may mathematically or otherwise determine whether the location of the touch input is within the area of the exclusion zone 302. Notably, this may be performed based on the current size of the exclusion zone 302, which may be a default size or an expanded size, as discussed above with respect to the process 400. If the touch input is within the area of the exclusion zone 302, control passes to operation 506. If not, control passes to operation 508.

At operation 506, the computing device 102 ignores the touch input. In an example, the input/output software 116 may refrain from passing the touch input from the touchscreen 108 to the application 114. After operation 506, the process 500 ends. At operation 508, the computing device 102 passes the touch input to the application 114. After operation 508, the process 500 ends.

Variations on the illustrated systems and methods are possible. As one possibility, it should be noted that there may be multiple physical controls 110, each with its own respective exclusion zone 302.

As another possibility, it should be noted that there may be more than two different sizes of exclusion zone 302. For instance, if the physical control 110 is configured to provide information indicative of multiple levels of closeness of a user to the physical control 110, then as each level of closeness becomes closer to the physical control 110, the size of exclusion zone 302 may be enlarged.

Thus, by using the exclusion zone 302 of dynamic size enforced in software by the input/output software 116 of the system 100, selective ignoring of touch input to the touchscreen 108 may be implemented without requiring changes to the display hardware or firmware. Moreover, this solution may also allow for onscreen controls 202 to be placed closer to the physical control 110 than a finger width, with minimal possibility of the onscreen controls 202 being accidentally actuated while the user is interacting with the physical control 110.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for selectively ignoring touch input from a user, comprising:
    a touchscreen, configured to display onscreen controls and to receive touch input;
    a physical control, at least partially overlapping the touchscreen, additionally configured to receive touch input; and
    a processor, programmed to
        responsive to receipt of touch input to the physical control, increase a size of an exclusion zone surrounding the physical control from a non-zero default size to an enlarged size greater than the non-zero default size, the exclusion zone representing an area of the touchscreen within which touch input to the touchscreen is not passed to an application executed by the processor, and
        responsive to a lack of receipt of the touch input to the physical control, decrease the size of the exclusion zone from the enlarged size to the non-zero default size, to allow touch input to onscreen controls outside the non-zero default size of the exclusion zone to be passed to the application.

2. The system of claim 1, wherein the physical control is conductively coupled to a surface of the touchscreen, such that presence of the user at the physical control is detected by the touchscreen as touch input to the physical control.

3. The system of claim 1, wherein the physical control is configured to detect presence of the user at the physical control, independent of touch input functionality of the touchscreen.

4. The system of claim 1, wherein one or more of the onscreen controls are displayed at least partially within the exclusion zone of the enlarged size.

5. The system of claim 1, wherein the physical control is a knob control.

6. The system of claim 1, wherein the touchscreen is a capacitive touchscreen device.

7. The system of claim 1, wherein the processor is further configured to:
    detect multiple levels of closeness of a user to the physical control, the multiple levels of closeness indicating increasing sizes of the exclusion zone surrounding the physical control as the user becomes closer to the physical control; and
    settings the size of exclusion zone to the size corresponding to the level of closeness of the user to the physical control.

8. A method for selectively ignoring touch input from a user, comprising:
    responsive to receipt of touch input to a physical control, the physical control at least partially overlapping a touchscreen configured to display onscreen controls, increasing a size of an exclusion zone surrounding the physical control from a non-zero default size to an enlarged size greater than the non-zero default size, the exclusion zone representing an area of the touchscreen within which touch input to the touchscreen is not passed to an application displaying onscreen controls to the touchscreen; and responsive to a lack of receipt of the touch input to the physical control, decreasing the size of the exclusion zone from the enlarged size to the non-zero default size, allowing touch input to onscreen controls outside the non-zero default size of the exclusion zone to be passed to the application.

9. The method of claim 8, wherein the physical control is conductively coupled to a surface of the touchscreen, such that presence of the user at the physical control is detected by the touchscreen as touch input to the physical control.

10. The method of claim 8, wherein the physical control detects presence of the user at the physical control, independent of touch input functionality of the touchscreen.

11. The method of claim 8, further comprising displaying one or more of the onscreen controls at least partially within the exclusion zone of the enlarged size.

12. The method of claim 8, wherein the physical control is a knob control.

13. The method of claim 8, wherein the touchscreen is a capacitive touchscreen.

14. A non-transitory computer-readable medium comprising instructions selectively ignoring touch input from a user that, when executed by a processor of a computing device, cause the computing device to:

responsive to receipt of touch input to a physical control, the physical control at least partially overlapping a touchscreen configured to display onscreen controls, increase a size of an exclusion zone surrounding the physical control from a non-zero default size to an enlarged size greater than the non-zero default size, the exclusion zone representing an area of the touchscreen within which touch input to the touchscreen is not passed to an application executed by the processor to display onscreen controls to the touchscreen; and responsive to a lack of receipt of the touch input to the physical control, decrease the size of the exclusion zone from the enlarged size to the non-zero default size, allowing touch input to onscreen controls outside the non-zero default size of the exclusion zone to be passed to the application.

15. The medium of claim 14, wherein the physical control is conductively coupled to a surface of the touchscreen, such that presence of the user at the physical control is detected by the touchscreen as touch input to the physical control.

16. The medium of claim 14, wherein the physical control detects presence of the user at the physical control, independent of touch input functionality of the touchscreen.

17. The medium of claim 14, further comprising displaying one or more of the onscreen controls at least partially within the exclusion zone of the enlarged size.

18. The medium of claim 14, wherein the physical control is a knob control.

19. The medium of claim 14, wherein the touchscreen is a capacitive touchscreen.

* * * * *